United States Patent
Hsieh

(10) Patent No.: US 7,418,133 B2
(45) Date of Patent: Aug. 26, 2008

(54) IMAGE CORRECTION SYSTEMS AND METHODS THEREOF

(75) Inventor: Wen-Hsuan Hsieh, Lowdong Town (TW)

(73) Assignee: Quisda Corporation, Taoyuan (TW)

( * ) Notice: Subject to any disclaimer, the term of this patent is extended or adjusted under 35 U.S.C. 154(b) by 520 days.

(21) Appl. No.: 11/117,162

(22) Filed: Apr. 28, 2005

(65) Prior Publication Data

US 2005/0244054 A1 Nov. 3, 2005

(30) Foreign Application Priority Data

Apr. 28, 2004 (TW) ............................... 93111935 A

(51) Int. Cl.
*G06K 9/00* (2006.01)
*G06K 9/38* (2006.01)

(52) U.S. Cl. ...................... 382/167; 382/172

(58) Field of Classification Search ................. 382/167, 382/172

See application file for complete search history.

(56) References Cited

U.S. PATENT DOCUMENTS

| | | | | |
|---|---|---|---|---|
| 5,710,828 A | * | 1/1998 | Hashimoto | 382/172 |
| 6,151,405 A | * | 11/2000 | Douglass et al. | 382/133 |
| 6,204,940 B1 | * | 3/2001 | Lin et al. | 358/527 |
| 6,236,751 B1 | * | 5/2001 | Farrell | 382/168 |
| 6,269,186 B1 | * | 7/2001 | Makita | 382/172 |
| 6,351,815 B1 | * | 2/2002 | Adams | 726/32 |
| 6,580,825 B2 | * | 6/2003 | Bhaskar | 382/169 |
| 6,873,731 B2 | * | 3/2005 | Takakura et al. | 382/172 |
| 6,937,253 B2 | * | 8/2005 | Bala | 345/589 |
| 2003/0174886 A1 | * | 9/2003 | Iguchi et al. | 382/167 |

* cited by examiner

*Primary Examiner*—Jingge Wu
*Assistant Examiner*—Max Shikhman
(74) *Attorney, Agent, or Firm*—Thomas, Kayden, Horstemeyer & Risley

(57) ABSTRACT

Systems and methods thereof for image correction are provided in an exemplary method, an image is received and pixels therein are read. A frequency value is calculated for each of the color scale values, representing how many pixels correspond to each of the color scale values. A color-scale threshold is acquired by limiting summation of frequency values from the brightest end to the color-scale threshold being a minimum value exceeding or equaling a ratio of pixels. Lower/upper limits are acquired by respectively adding/subtracting a range value to/from the color-scale threshold. A weighted value is acquired for the pixels with pixel values between the lower color-scale limit and the upper color-scale limit. The updated image is generated by replacing pixel values between the lower limit and upper limit with the weighted value.

15 Claims, 10 Drawing Sheets

IMAGE CORRECTION SYSTEMS AND METHODS THEREOF

BACKGROUND

The present invention relates to bitmap image processing technology, and more particularly, to systems and methods thereof for image correction.

A bitmap image is a map or organized array of pixels of bit-based information, often mapped at hundreds of pixels. For example, an 3 inches by 2 inches bitmap image with a resolution of 300 pixels per inch produces 900 pixels by 600 pixels-, that is, 540000 pixels totally.

The bitmap image contains three types of images, black and white, grayscale, and RGB. A black and white bitmap image contains the least information for each pixel, i.e., information regarding whether each pixel is black or white. Using the binary counting method, a grayscale bitmap (black to white) has a color depth of 256. Each pixel is represented as having one of 256 different grays (values), including black and white. An RGB bitmap image has a color depth of 16.77 million colors, 256×256×256. Each pixel has information for each of the 3 RGB colors. Each pixel in the bitmap array describes a layer of one of 256 values for red, one of 256 values for green and one of 256 values for blue.

Scanning documents by reflective scanners have been used in a variety of processes for digitalizing an original document to a machine-readable version (i.e., a bitmap image). A problem associated with digitizing an original document is bleed-through, wherein a pattern interferes with text and/or images to be digitalized due to the penetration from the reverse side of scanned monochromic or chromatic documents, resulting in digitalization degradation. FIG. 1 is a schematic diagram of a conventional digitalized bitmap image. Area 11 is a bleed-through pattern penetrating from the reverse side of a scanned document after scanning. In addition to bleed-through patterns, watermarks may also degrade the digitalization, and both bleed-through patterns and watermarks can be defined as shadow patterns. In view of these drawbacks, a need exists for a system and method of image correction that removes shadow patterns from bitmap images.

SUMMARY

An embodiment of an image correction system can be utilized to receive a bitmap image and produce a revised bitmap image. The image correction system comprises an image acquisition unit, a distribution calculation unit, a potential range calculation unit, a weighted value calculation unit and an image correction unit. The image acquisition unit receives the bitmap image, with the bitmap image comprising multiple pixels, each pixel comprising a pixel value corresponding to one of the color-scale values. The distribution calculation unit calculates a frequency value for each of the color-scale values, representing how many pixels in the bitmap image correspond to each of the color-scale values. The potential range calculation unit acquires a color-scale threshold by limiting summation of frequency values from the brightest end to the color-scale threshold, whereas summation of frequency values is a minimum value exceeding or equaling a ratio of pixels, and acquires a lower color-scale limit and an upper color-scale limit by respectively adding and subtracting a range value to and from the color-scale threshold. The weighted value calculation unit acquires a weighted value for pixels with values between the lower color-scale limit and the upper color-scale limit. The image correction unit replaces the pixel values between the lower color-scale limit and upper color-scale limit with the weighted value, thereby producing the revised bitmap image.

An embodiment of an image correction method comprises: receiving the bitmap image; calculating a frequency value for each of the color-scale values, representing how many pixels in the bitmap image correspond to each of the color-scale values; acquiring a color-scale threshold by calculating the bright end frequency values whose sum comprises a ratio of the pixels; acquiring a color-scale threshold by calculating the bright end frequency values whose sum comprises a ratio of the pixels; acquiring a lower color-scale limit and an upper color-scale limit by respectively adding and subtracting a range value to and from the color-scale threshold; acquiring a weighted value for the pixels with values between the lower color-scale limit and the upper color-scale limit; and replacing the pixel values between the lower color-scale limit and upper color-scale limit with the weighted value.

Computer-readable storage media for storing computer programs also are disclosed for performing methods of image correction.

BRIEF DESCRIPTION OF THE DRAWINGS

The present invention can be more fully understood by reading the subsequent detailed description and examples of embodiments thereof with reference made to the accompanying drawings, wherein.

DETAILED DESCRIPTION

Figure 1:
FIG. 1 is a schematic diagram of a conventional digitalized bitmap image.
Figure 2:
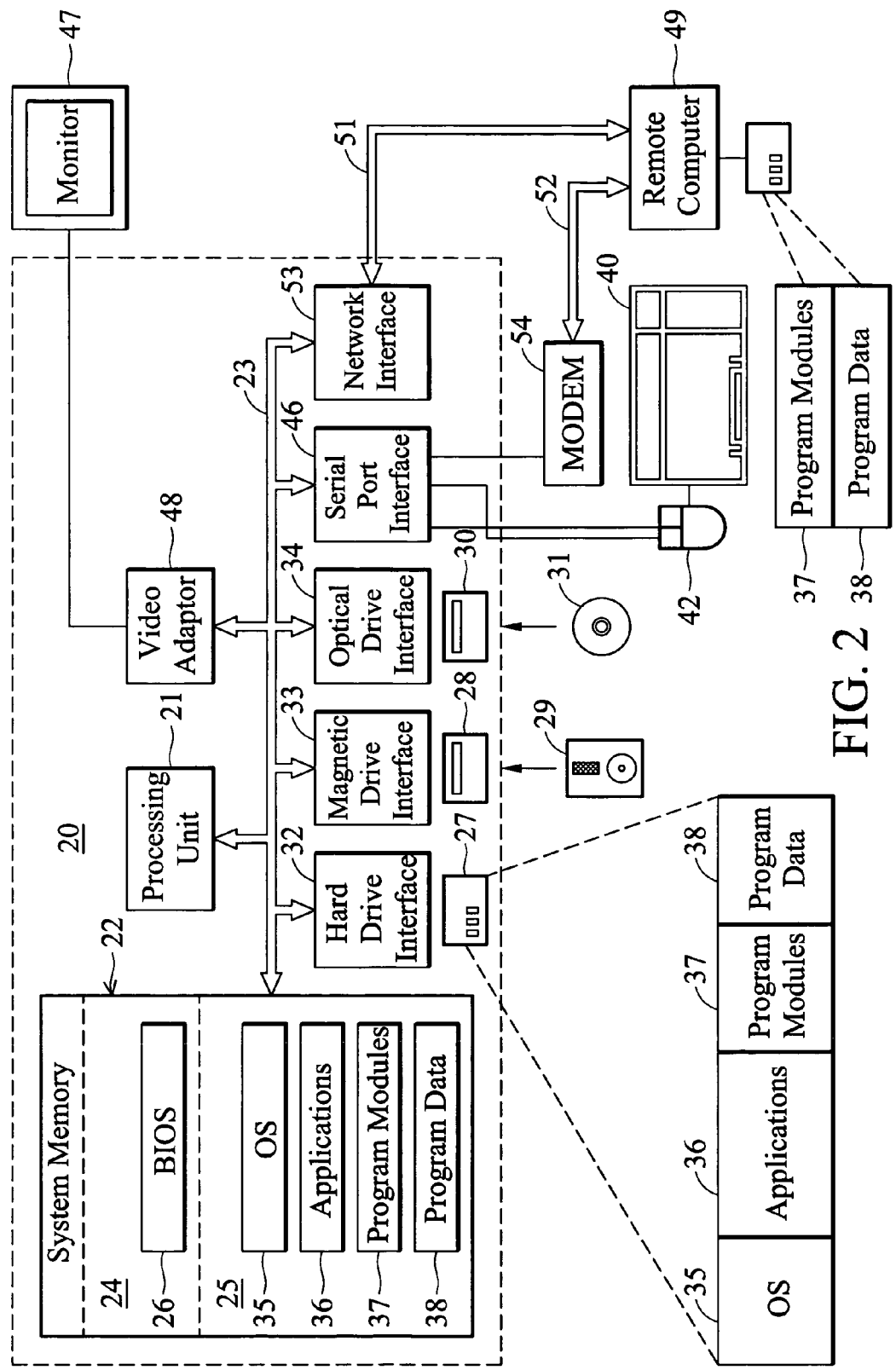
FIG. 2 is a diagram of an embodiment of hardware and operating environment.

FIG. 2 is a diagram of an embodiment of a hardware and operating environment. The description of FIG. 2 is provides a brief, general description of suitable computer hardware and a suitable computing environment in conjunction with which at least some embodiments may be implemented. Generally, program modules include routines, programs, objects, components, or others, that perform particular tasks or implement particular abstract data types. Moreover, those skilled in the art should understand that embodiments may be practiced in other computer system configurations, for example, hand-held devices, multiprocessor-based, microprocessor-based or programmable consumer electronics, network PC's, mini-computers, mainframe computers, and the like. Some embodiments may also be practiced in distributed computing environments where tasks are performed by remote processing devices linked through a communication network. In a distributed computing environment, program modules may be located in both local and remote memory storage devices.

The hardware and operating environment of FIG. 2 includes a general purpose computing device in the form of a computer 20, including a processing unit 21, system memory 22, and a system bus 23 that operatively couples various system components including the system memory 22 to the processing unit 21. There may be one or more processing units 21, such that the processor of the computer 20 comprises a single central processing unit (CPU), or multiple processing units, commonly referred to as a parallel processing environment.

The system bus 23 may be any of several types of bus structures including a memory bus or memory controller, a peripheral bus, or a local bus using any of a variety of bus architectures. The system memory may also be referred to as simply the memory, and may include read only memory (ROM) 24 and random access memory (RAM) 25. A basic input/output system (BIOS) 26, containing the basic routines that help to transfer information between components within the computer 20, such as during start-up, is stored in ROM 24. The computer 20 further includes a hard disk drive 27 reading from and writing to a hard disk (not shown), a magnetic disk drive 28 reading from and writing to a magnetic disk 29 and an optical disk drive 30 reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20.

An operating system (OS) 35, one or more application programs 36, program modules 37, and program data 38 may be stored on the hard disk, magnetic disk 29, optical disk 31, ROM 24, or RAM 25. Commands and information may be entered into the computer 20 through input devices such as a keyboard 40 and pointing device 42. A monitor 47 or other type of display device is also connected to the system bus 23 via an interface, such as a video adapter 48. In addition to the monitor, computers typically include other peripheral output devices (not shown), such as printers.

Several embodiments will now be introduced as follows for dealing with grayscale bitmap images and RGB bitmap images.

Figure 3:
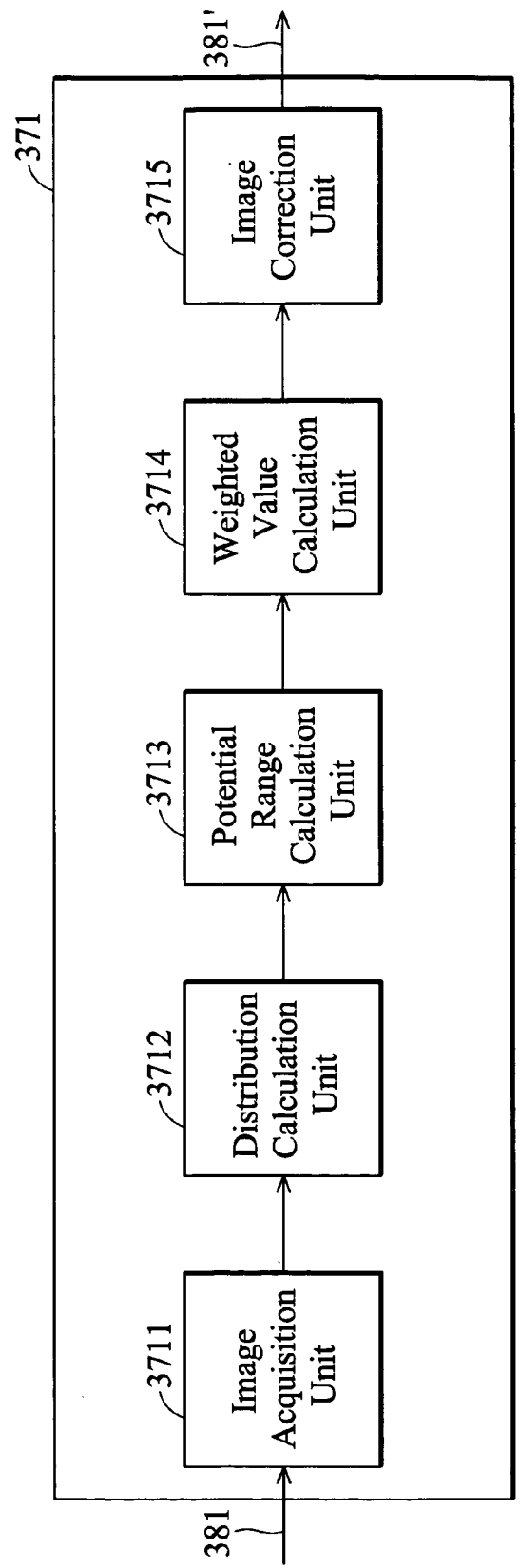
FIG. 3 is a diagram of the system architecture of an embodiment of a grayscale image correction system.

FIG. 3 is a diagram of the system architecture of an embodiment of a grayscale image correction system. A grayscale image correction system may be practiced in one or more program modules loaded and executed by the processing unit 21, or in circuits or printed circuits in an electronic apparatus, such as a scanner. The grayscale image correction system 371 of FIG. 3 comprises an image acquisition unit 3711, a distribution calculation unit 3712, a potential range calculation unit 3713, a weighted value calculation unit 3714 and an image correction unit 3715.

Figure 5:
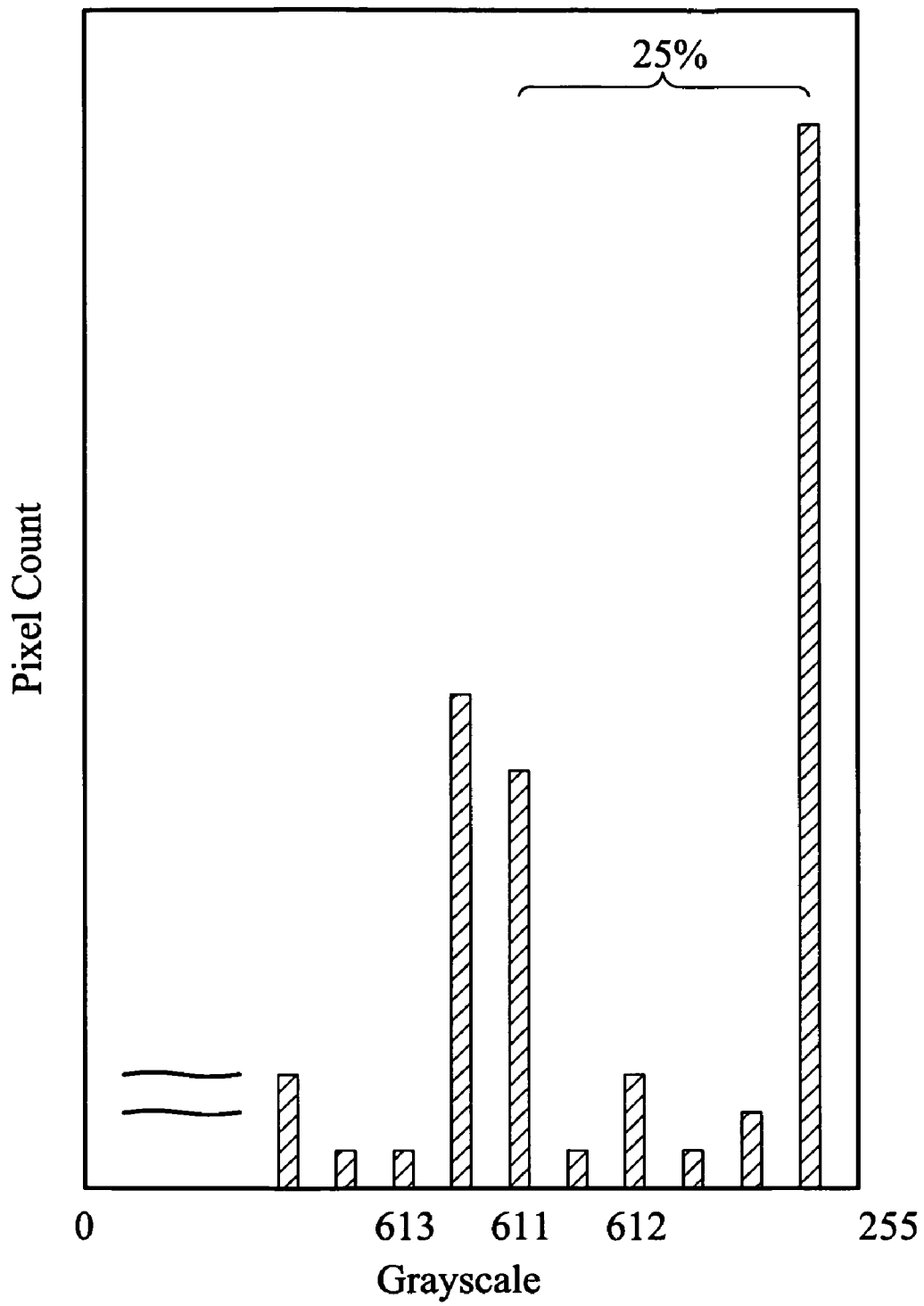
FIG. 5 is histogram for the grayscale value distribution in the grayscale bitmap image.

The image acquisition unit 3711 receives a grayscale bitmap image 381 containing pixels from the program data 38. The distribution calculation unit 3712 reads all pixels' grayscale values in the grayscale bitmap image 381, and calculates a frequency value for each grayscale value (preferably ranging from 0 to 255), representing how many pixels in the grayscale bitmap image 381 contain that grayscale value. FIG. 5 is an exemplary histogram for the grayscale value distribution in a representative grayscale bitmap image.

Referring to FIG. 5, the potential range calculation unit 3713 acquires a grayscale threshold 611 as a center of a potential range. The grayscale threshold 611 is acquired by limiting summation of frequency values from the brightest end to the grayscale threshold 611, whereas summation of frequency values is a minimum value exceeding or equaling a ratio (preferably 1/4) of pixels, i.e., being a 25 percentile of pixel values. The potential range calculation unit 3713 acquires lower and upper limits, 613 and 612, by respectively adding and subtracting a range value (preferably 30) to and from the grayscale threshold. The potential range between the lower and upper limits, 613 and 612, may comprise pixel values of shadow patterns. The weighted value calculation unit 3714 acquires a weighted value for pixels with grayscale values between the lower limit and the upper limit. The weighted value is calculated using Equation (1).

Equation (1):

$$\bar{g} = \frac{\sum_{g=g1}^{g2} n(g) * g}{\sum_{g=g1}^{g2} n(g)},$$

where g1 represents the lower limit 613, g2 the upper limit 612, g a grayscale value, and n(g) a frequency value for the grayscale value g, representing how many pixels in the grayscale bitmap image 381 contain the grayscale value g.

The image correction unit 3715 replaces grayscale values between the lower limit and upper limit in the grayscale bitmap image 381 by utilizing the weighted value. Various approaches, e.g., blind replacement and blurred replacement, can be employed in the replacement. In the blind replacement approach, grayscale values between the lower limit and upper limit are all replaced with the weighted value. In the blurred replacement approach, grayscale values between the lower limit and upper limit are replaced with a blurred weighted value that is defined by Equation (2).

Equation (2):

$$g^* = w * \bar{g} + (1-w) * g,$$

where $\bar{g}$ represents a weighted value calculated by equation (1), w is a number between 0 and 1 (preferably 0.8), and g represents a grayscale value between the upper limit 612 and the lower limit 613.

Figure 4:
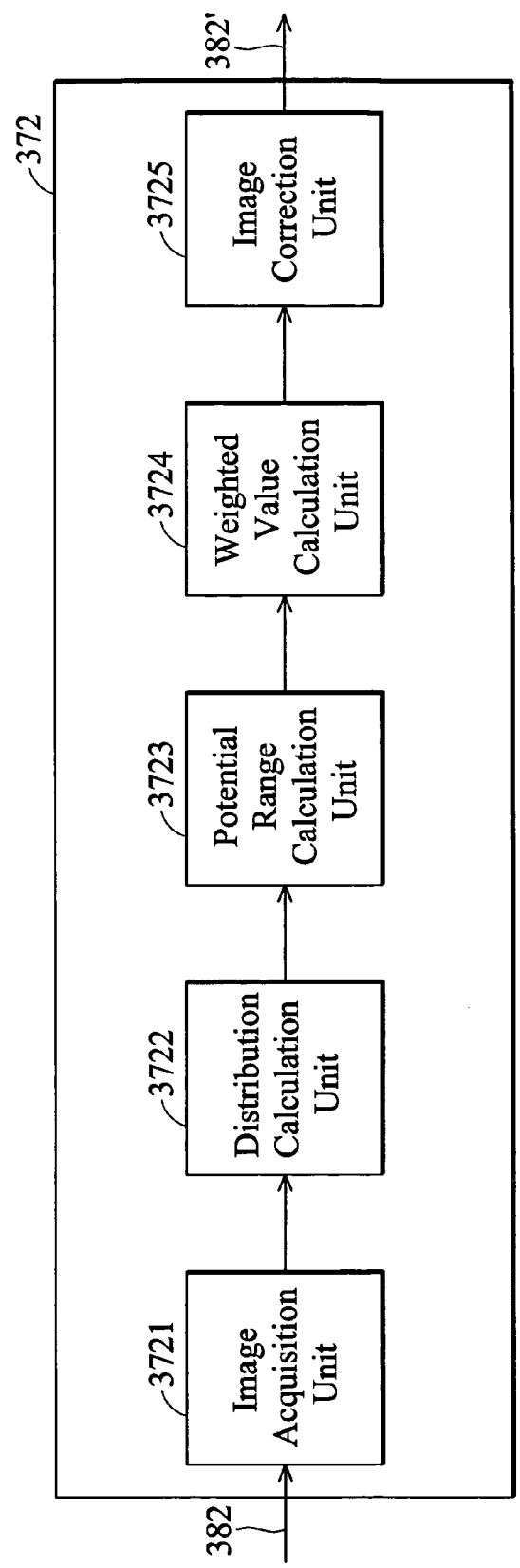
FIG. 4 is a diagram of the system architecture of an embodiment of an RGB image correction system.

FIG. 4 is a diagram of the system architecture of an embodiment of an RGB image correction system. An RGB image correction system may be practiced in one or more program modules loaded and executed by the processing unit 21, or in circuits or printed circuits in an electronic apparatus, such as a scanner. The RGB image correction system 372 of FIG. 4 comprises an image acquisition unit 3721, a distribution calculation unit 3722, a potential range calculation unit 3723, a weighted value calculation unit 3724 and an image correction unit 3725.

Figure 6A:
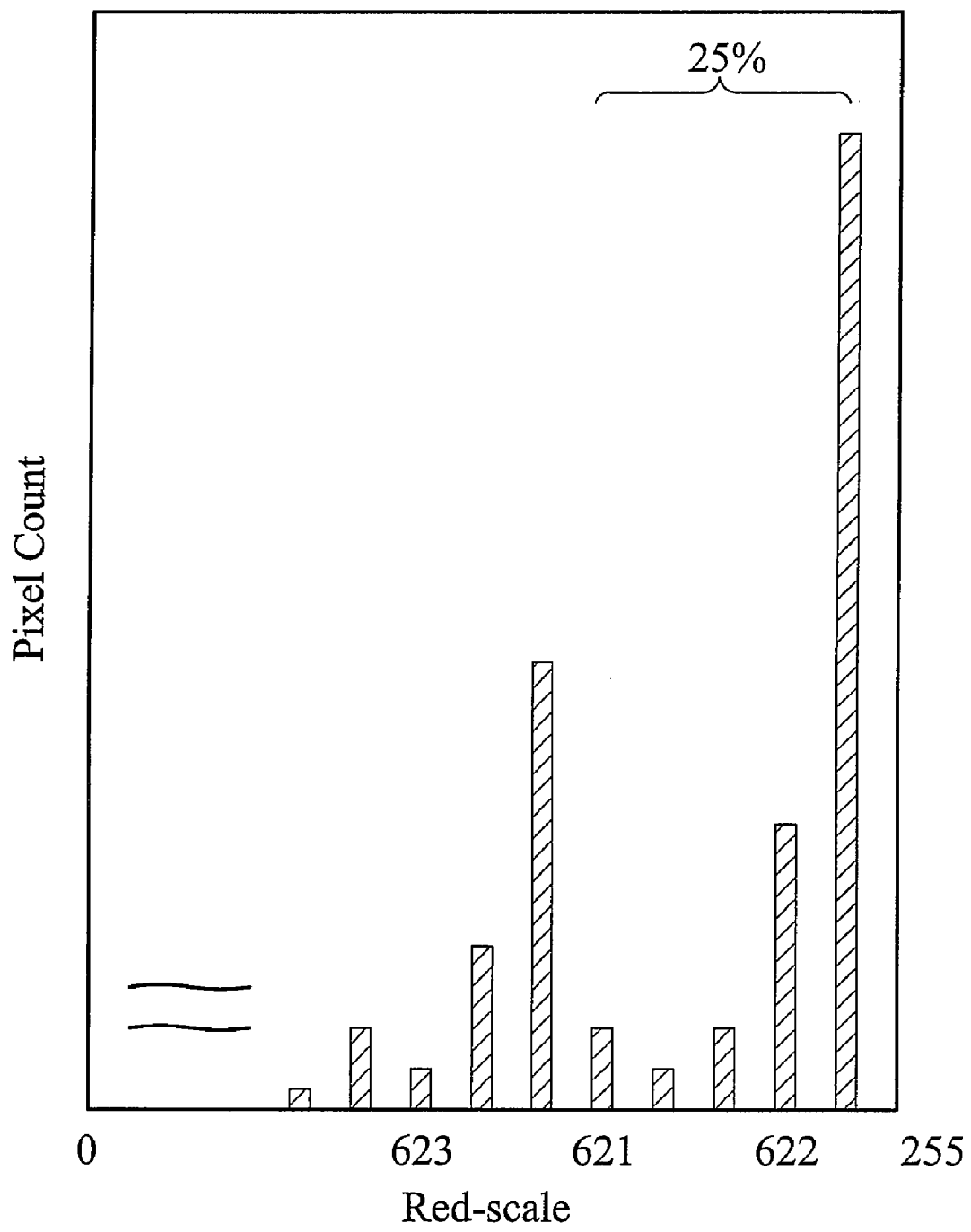
FIGS. 6a, 6b and 6c are histograms for the red-, green- and blue-scale value distribution in the RGB bitmap image.
Figure 6B:
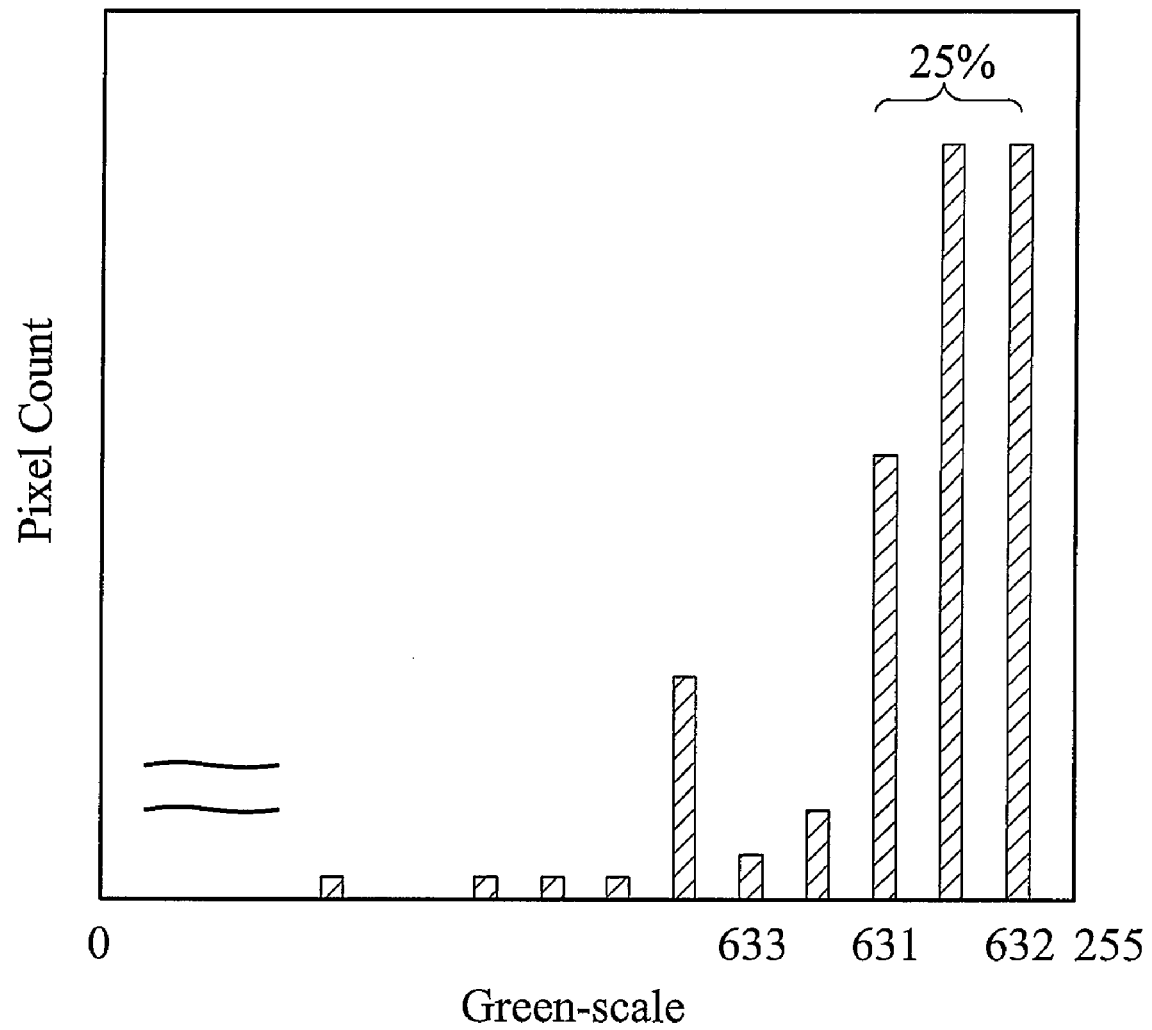
Figure 6C:
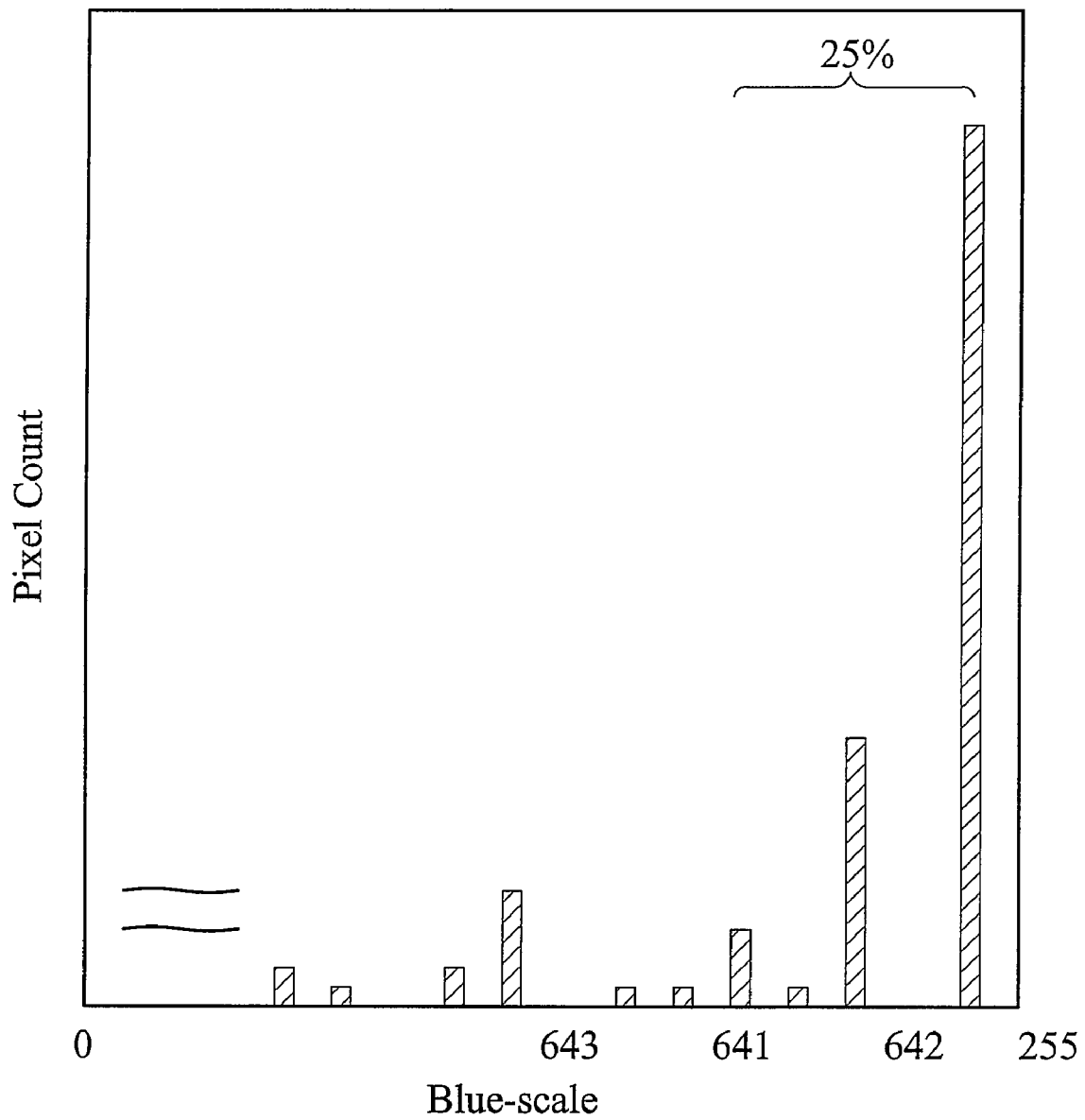

The image acquisition unit 3721 receives an RGB bitmap image 382 containing pixels from the program data 38, each pixel comprising red-, green- and blue-scale values. The distribution calculation unit 3722 reads all pixels' red-, green- and blue-scale values in the RGB bitmap image 382, and respectively calculates a red frequency value for each red-scale value (preferably ranges from 0 to 255), representing how many pixels in the RGB bitmap image 382 contain that red-scale value, a green frequency value for each green-scale value (preferably ranges from 0 to 255), representing how many pixels contain that green-scale value, and a blue frequency value for each blue-scale value (preferably ranges from 0 to 255), representing how many pixels contain that blue-scale value. FIGS. 6a, 6b and 6c are exemplary histograms for the red-, green- and blue-scale value distribution in the RGB bitmap image.

Referring to FIGS. 6a, 6b and 6c, the potential range calculation unit 3723 acquires a red-scale threshold 621 by limiting summation of frequency values from the brightest end to the red-scale threshold 621, whereas summation of frequency values is a minimum value exceeding or equaling a ratio (preferably 1/4) of pixels, a green-scale threshold 631 by limiting summation of frequency values from the brightest end to the green-scale threshold 631, whereas summation of frequency values is a minimum value exceeding or equaling a ratio (preferably 1/4) of pixels, and a blue-scale threshold 641 by limiting summation of frequency values from the brightest end to the blue-scale threshold 641, whereas summation of frequency values is a minimum value exceeding or equaling a ratio (preferably 1/4) of pixels. It is noted that the above ratios may be different and/or may be configured by an operator. The potential range calculation unit 3723 acquires lower and upper red-scale limits, 613 and 612, by respectively adding and subtracting a range value (preferably 30) to and from the red-scale threshold 621, lower and upper green-scale limits, 623 and 622, by respectively adding and subtracting a range value (preferably 30) to and from the green-scale threshold 631, and lower and upper blue-scale limits, 633 and 632, by respectively adding and subtracting a range value (preferably 30) to and from the blue-scale threshold 631. It is noted that the above range values may be different and/or may be configured by an operator. The weighted value calculation unit 3724 acquires a weighted red value for pixels with red-scale values between the lower red-scale limit and the upper red-scale limit. The weighted red value is calculated using Equation (3).

Equation (3):

$$\bar{r} = \frac{\sum_{r=r1}^{r2} n(r)*r}{\sum_{r=r1}^{r2} n(r)},$$

where r1 represents the lower red-scale limit 623, r2 the upper red-scale limit 622, r a red-scale value, and n(r) a frequency value for the red-scale value r, representing how many pixels in the RGB bitmap image 382 contain the red-scale value r. The weighted value calculation unit 3724 acquires a weighted green value for pixels with green-scale values between the lower green-scale limit and the upper green-scale limit. The weighted green value is calculated using Equation (4).

Equation (4):

$$\bar{gr} = \frac{\sum_{gr=gr1}^{gr2} n(gr)*gr}{\sum_{gr=gr1}^{gr2} n(gr)},$$

where gr1 represents the lower green-scale limit 633, gr2 the upper green-scale limit 632, gr a green-scale value, and n(gr) a frequency value for the green-scale value gr, representing how many pixels in the RGB bitmap image 382 contain the green-scale value gr. The weighted value calculation unit 3724 acquires a weighted blue value for pixels with blue-scale values between the lower blue-scale limit and the upper blue-scale limit. Equation (5) calculates the weighted blue value.

Equation (5):

$$\bar{b} = \frac{\sum_{b=b1}^{b2} n(b)*b}{\sum_{b=b1}^{b2} n(b)},$$

where b1 represents the lower blue-scale limit 643, b2 the upper blue-scale limit 642, b a blue-scale value, and n(b) a frequency value for the blue-scale value b, representing how many pixels in the RGB bitmap image 382 contain the blue-scale value b.

For each pixel in the RGB bitmap image 382, the image correction unit 3725 determines whether a red-scale value, a green-scale value and a blue-scale value therein are respectively between the lower and upper red-scale limits, the lower and upper green-scale limits and the lower and upper blue-scale limits. If so, the image correction unit 3725 replaces the red-scale, green-scale and blue-scale values by utilizing the weighted red, green and blue values. Various approaches, e.g., blind replacement and blurred replacement, can be employed in the replacement. In the blind replacement approach, the red-scale, green-scale and blue-scale values are all replaced with the weighted red, green and blue values. In the blurred replacement approach, the red-scale, green-scale and blue-scale values are replaced with blurred weighted red-scale, green-scale and blue-scale values. Equation (6) is used to calculate the blurred weighted red-scale, green-scale and blue-scale values.

Equation (6):

$$(r^*, gr^*, b^*) = w*(\bar{r}, \bar{gr}, \bar{b}) + (1-w)*(r, gr, b),$$

where $\bar{r}$ represents a weighted red-scale value calculated by equation (3), $\bar{gr}$ a weighted green-scale value calculated by equation (4), $\bar{b}$ a weighted blue-scale value calculated by equation (5), w is a number between 0 and 1 (preferably is 0.8), r a red-scale value, gr a green-scale value and b a blue-scale value.

Figure 7:
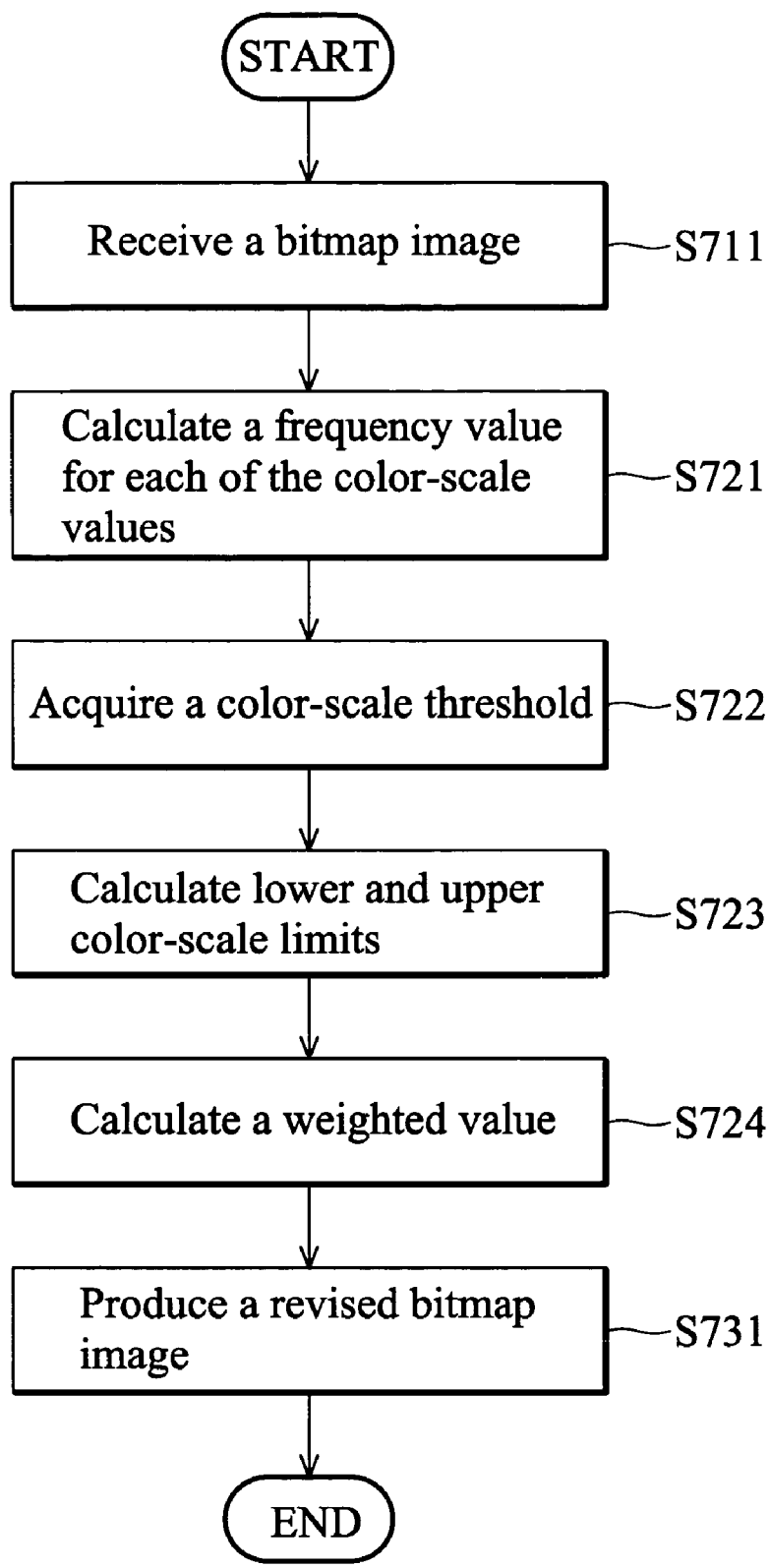
FIG. 7 is a flowchart of an embodiment of a method of image correction.

FIG. 7 shows an embodiment of a method of image correction. In step S711, a bitmap image, such as a grayscale bitmap image, an RGB bitmap image, or bitmap images with other color formats, comprising pixels, is received from the program data 38. Each pixel comprises at least one color-scale value. For example, in the grayscale bitmap image, each pixel comprises a grayscale value, and in the RGB bitmap image, each pixel comprises red-scale, green-scale and blue-scale values.

In step S721, all pixels' color scale values are read in the bitmap image, and a frequency value for each color-scale value (preferably ranges from 0 to 255), representing how many pixels in the bitmap image contain the color-scale value is calculated. In step S722, a color-scale threshold is acquired by limiting summation of frequency values from the brightest end to the color-scale threshold, whereas summation of frequency values is a minimum value exceeding or equaling a ratio of pixels. It is noted that more than one color-scale threshold may be calculated when pixels in the bitmap images comprise more than one color-scale value. In step S723, lower and upper color-scale limits are acquired by respectively adding and subtracting a range value to and from the color-scale threshold. It is noted that more than one pair of lower and upper color-scale limits may be calculated when pixels in the bitmap images comprise more than one color-scale value. In step S724, a weighted color-scale value for pixels with color-scale values between the lower limit and the upper limit is acquired. It is noted that more than one weighted color-scale value may be calculated when pixels in the bitmap images comprise more than one color-scale value. Equation (7) is used to calculate the weighted color-scale value.

Equation (7):

$$\bar{c} = \frac{\sum_{c=c1}^{c2} n(c)*c}{\sum_{c=c1}^{c2} n(c)},$$

where c1 represents the lower color-scale limit, c2 the upper color-scale limit, c a color-scale value, and n(c) a frequency value for the color-scale value c, representing how many pixels in the bitmap image contain the color-scale value c.

Finally, in step S731, for each pixel in the bitmap image 382, the process determines whether all color-scale values are between the corresponding lower and upper color-scale limits. If so, the color-scale values are replaced by utilizing the corresponding weighted color-scale values. Various approaches, e.g., blind replacement and blurred replacement, can be employed in the replacement. In the blind replacement approach, the color-scale values are all replaced with corresponding weighted color-scale values. In the blurred replacement approach, the color-scale values are replaced with corresponding blurred weighted color-scale values. Equation (8) is used to calculate the blurred weighted color-scale values.

Equation (8):

$$c^* = w*\bar{c} + (1-w)*p,$$

where $\bar{c}$ represents a weighted color-scale value calculated by equation (7), w is a number between 0 and 1 (preferably is 0.8), and p represents a color-scale value.

Figure 8:
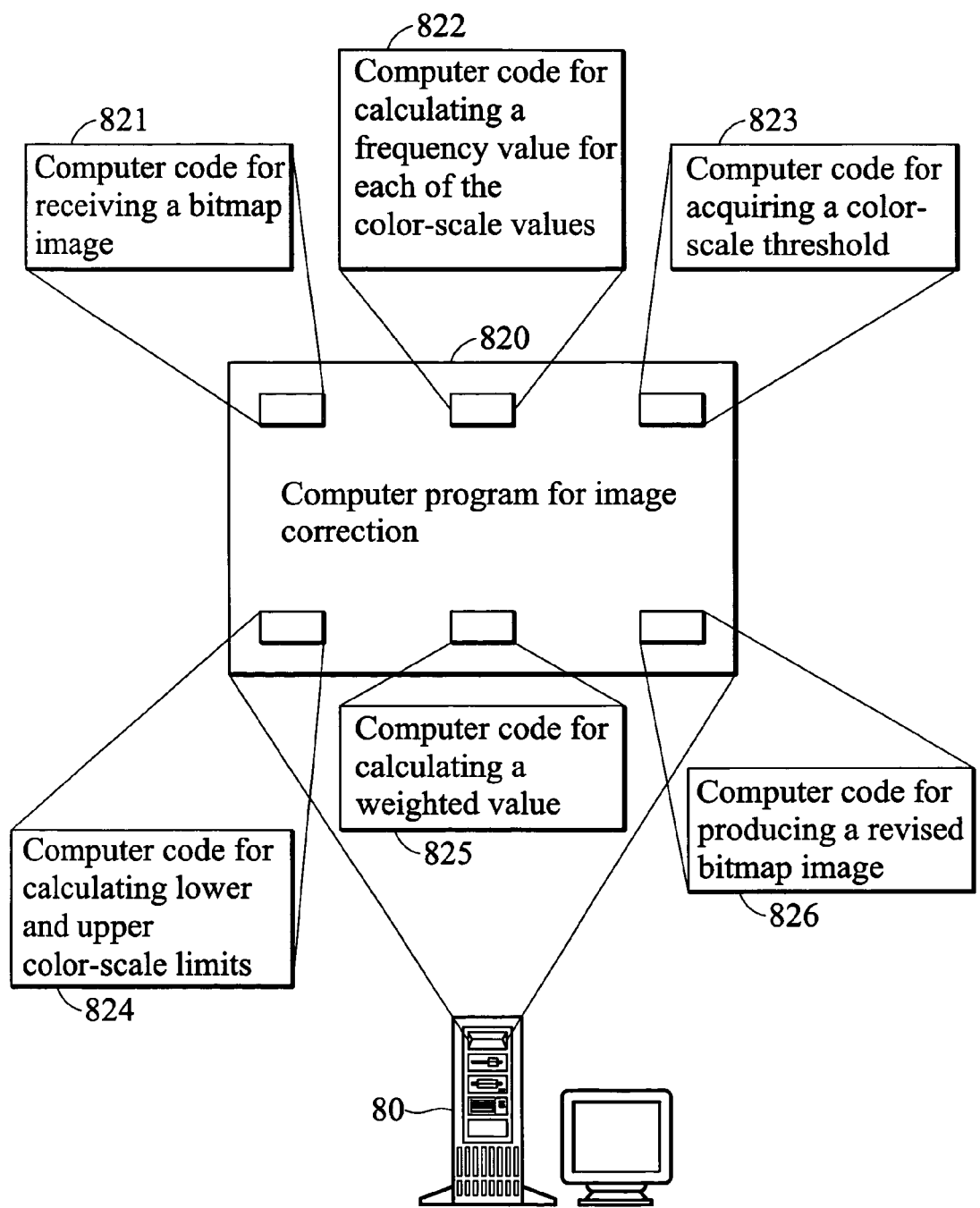
FIG. 8 is a diagram of an embodiment of a storage medium for a computer program providing a method of image correction.

An exemplary storage medium is shown in FIG. 8 for storing a computer program 820 that provides a computer-implemented method of image correction. The storage medium 70 comprises computer readable program code embodied in the medium for use in a computer system, the computer readable program code comprising at least computer readable program code 821 for receiving a bitmap image comprising pixels, computer readable program code 822 for calculating a frequency value for each color-scale value, computer readable program code 823 for acquiring a color-scale threshold, computer readable program code 824 for acquiring lower and upper color-scale limits, computer readable program code 825 for calculating a weighted color-scale value, and computer readable program code 826 for replacing the color-scale value when the color-scale value is between the lower and upper color-scale limits.

Embodiments of methods and systems, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. Embodiments of methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of image correction, utilized to receive an image and produce a revised image, comprising:
   an image acquisition unit, configured to receive the image, the image comprising a plurality of pixels, each pixel comprising a pixel value corresponding to one of a plurality of color-scale values;
   a distribution calculation unit, configured to calculate a frequency value for each of the color-scale values, representing how many pixels in the image correspond to each of the color-scale values;
   a potential range calculation unit, configured to acquire a color-scale threshold by accumulating the frequency values of the color-scale values from the brightest end to a color-scale value being the color-scale threshold until an accumulated frequency value exceeds or equals a ratio of total pixels, and acquire a lower color-scale limit and an upper color-scale limit by respectively adding and subtracting a range value to and from the color-scale threshold;
   a weighted value calculation unit, configured to acquire a weighted value for pixels with the pixel values between the lower color-scale limit and the upper color-scale limit; and
   an image correction unit, configured to replace the pixel values between the lower color-scale limit and upper color-scale limit with the weighted value, thereby generating the revised image.

2. The system as claimed in claim 1 wherein the ratio is 1/4.

3. The system as claimed in claim 1 wherein the range value is 30.

4. The system as claimed in claim 1 wherein the image is a grayscale image or a RGB image.

5. The system as claimed in claim 1 wherein the weighted value is calculated by the equation, $$\bar{c} = \frac{\sum_{c=c1}^{c2} n(c)*c}{\sum_{c=c1}^{c2} n(c)},$$

wherein $\bar{c}$ represents the weighted value, c1 represents the lower color-scale limit, c2 represents the upper color-scale limit, c represents a color-scale value, and n(c) represents the frequency value for the color-scale value c.

6. The system as claimed in claim 1 wherein the weighted value is calculated by the equations, $$\bar{c} = \frac{\sum_{c=c1}^{c2} n(c)*c}{\sum_{c=c1}^{c2} n(c)},$$

$$c^* = w*\bar{c} + (1-w)*c,$$

wherein $\bar{c}$ represents a temporarily weighted value, c* represents the weighted value, c1 represents the lower color-scale limit, c2 represents the upper color-scale limit, c represents a color-scale value, n(c) represents the frequency value for the color-scale value c, and w represents a number between 0 and 1.

7. The system as claimed in claim 6 wherein the number is 0.8.

8. A method of image correction, utilized to receive an image and produce a revised image, the method comprising:

receiving the image, the image comprising a plurality of pixels, each pixel comprising a pixel value corresponding to one of a plurality of color-scale values;

calculating a frequency value for each of the color-scale values, representing how many pixels in the image correspond to each of the color-scale values;

acquiring a color-scale threshold by accumulating the frequency values of the color-scale values from the brightest end to a color-scale value being the color-scale threshold until an accumulated frequency value exceeds or equals a ratio of total pixels acquiring a lower color-scale limit and an upper color-scale limit by respectively adding and subtracting a range value to and from the color-scale threshold;

acquiring a weighted value for pixels with the pixel values between the lower color-scale limit and the upper color-scale limit; and replacing the pixel values between the lower color-scale limit and upper color-scale limit with the weighted value, thereby generating the revised image.

9. The method as claimed in claim 8 wherein the ratio is 1/4.

10. The method as claimed in claim 8 wherein the range value is 30.

11. The method as claimed in claim 8 wherein the image is a grayscale image or a RGB image.

12. The method as claimed in claim 8 wherein the weighted value is calculated by the equation, $$\bar{c} = \frac{\sum_{c=c1}^{c2} n(c)*c}{\sum_{c=c1}^{c2} n(c)},$$

wherein $\bar{c}$ represents the weighted value, c1 represents the lower color-scale limit, c2 represents the upper color-scale limit, c represents a color-scale value, and n(c) represents the frequency value for the color-scale value c.

13. The method as claimed in claim 8 wherein the weighted value is calculated by the equations, $$\bar{c} = \frac{\sum_{c=c1}^{c2} n(c)*c}{\sum_{c=c1}^{c2} n(c)},$$

$$c^* = w*\bar{c} + (1-w)*c,$$

wherein $\bar{c}$ represents a temporarily weighted value, c* represents the weighted value, c1 represents the lower color-scale limit, c2 represents the upper color-scale limit, c represents a color-scale value, n(c) represents the frequency value for the color-scale value c, and w represents a number between 0 and 1.

14. The method as claimed in claim 13 wherein the number is 0.8.

15. A computer-readable storage medium storing a computer program providing a method of image correction, the method comprising using a computer to perform the steps of:

receiving the image, the image comprising a plurality of pixels, each pixel comprising a pixel value corresponding to one of a plurality of color-scale values;

calculating a frequency value for each of the color-scale values, representing how many pixels in the image correspond to each of the color-scale values;

acquiring a color-scale threshold by accumulating the frequency values of the color-scale values from the brightest end to a color-scale value being the color-scale threshold until an accumulated frequency value exceeds or equals a ratio of total pixels;

acquiring a lower color-scale limit and a upper color-scale limit by respectively adding and subtracting a range value to and from the color-scale threshold;

acquiring a weighted value for pixels with the pixel values between the lower color-scale limit and the upper color-scale limit; and replacing the pixel values between the lower color-scale limit and upper color-scale limit with the weighted value, thereby generating the revised image.

* * * * *